US011136890B1

(12) United States Patent
Agudo et al.

(10) Patent No.: US 11,136,890 B1
(45) Date of Patent: Oct. 5, 2021

(54) COOLING CIRCUIT FOR A TURBOMACHINE COMPONENT

(71) Applicant: General Electric Company, Schenectady, NY (US)

(72) Inventors: Jan Emeric Agudo, Simpsonville, SC (US); Martin James Jasper, Simpsonville, SC (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 16/829,087

(22) Filed: Mar. 25, 2020

(51) Int. Cl.
*F01D 5/18* (2006.01)
*F02C 3/04* (2006.01)

(52) U.S. Cl.
CPC .............. *F01D 5/18* (2013.01); *F02C 3/04* (2013.01); *F05D 2240/30* (2013.01); *F05D 2240/35* (2013.01); *F05D 2260/20* (2013.01); *F05D 2260/606* (2013.01)

(58) Field of Classification Search
CPC .... F02C 3/04; F05D 2240/30; F05D 2240/35; F05D 2260/20; F05D 2260/606
See application file for complete search history.

(56) References Cited

U.S. PATENT DOCUMENTS

| 4,761,116 A | 8/1988 | Braddy et al. |
| 5,282,721 A | 2/1994 | Kildea |
| 5,503,527 A | 4/1996 | Lee et al. |
| 5,609,466 A * | 3/1997 | North ............... F01D 5/187 415/115 |
| 6,027,306 A | 2/2000 | Bunker |
| 6,059,530 A | 5/2000 | Lee |
| 6,350,102 B1 | 2/2002 | Bailey et al. |

(Continued)

FOREIGN PATENT DOCUMENTS

| EP | 1840332 A1 | 10/2007 |
| EP | 2093378 A1 | 8/2009 |
| EP | 2148042 A2 | 1/2010 |

OTHER PUBLICATIONS

Lomakin et al., Effect of Various Tip Clearance Squealer Design on Turbine Stage Efficiency, ASME, Turbo Expo 2015: Power for Land, Sea, and Air, vol. 2A: GT2015-4276, Jun. 15-19, 2015, Montreal.

(Continued)

*Primary Examiner* — Jesse S Bogue
(74) *Attorney, Agent, or Firm* — Dority & Manning, P.A.

(57) ABSTRACT

The rotor blade includes a platform and a shank extending radially inward from the platform. The rotor blade further includes an airfoil extending radially outward from the platform. The airfoil includes a leading edge and a trailing edge. A cooling circuit is defined within the shank and the airfoil. The cooling circuit includes a plurality of pins. The plurality of pins includes a first pin group positioned radially inward of the platform and a second pin group positioned within the airfoil. The cooling circuit further includes a plurality of exit channels disposed along the trailing edge. The plurality of exit channels is downstream from the plurality of pins. The cooling circuit also includes at least one bypass conduit extending from an inlet disposed in the cooling circuit to an outlet positioned on the trailing platform face. The at least one bypass conduit is positioned radially inward of the platform surface.

18 Claims, 6 Drawing Sheets

(56) References Cited

U.S. PATENT DOCUMENTS

| | | |
|---|---|---|
| 6,402,471 B1* | 6/2002 | Demers .................. F01D 5/081 |
| | | 416/97 R |
| 6,478,537 B2 | 11/2002 | Junkin |
| 7,118,329 B2 | 10/2006 | Goodman |
| 7,513,743 B2 | 4/2009 | Liang |
| 7,614,847 B2 | 11/2009 | Nelson et al. |
| 7,704,047 B2 | 4/2010 | Liang et al. |
| 8,182,221 B1 | 5/2012 | Liang |
| 8,414,262 B2 | 4/2013 | Hada |
| 8,512,003 B2 | 8/2013 | Klasing et al. |
| 8,684,691 B2 | 4/2014 | Lee et al. |
| 8,702,391 B2* | 4/2014 | Bregman .................. F01D 5/14 |
| | | 416/96 R |
| 8,814,518 B2* | 8/2014 | Harris, Jr. ............... F01D 5/081 |
| | | 416/97 R |
| 8,939,716 B1 | 1/2015 | Lee et al. |
| 2013/0171005 A1* | 7/2013 | Ellis ........................ F01D 5/187 |
| | | 416/97 R |
| 2014/0037458 A1 | 2/2014 | Lacy et al. |
| 2015/0147158 A1 | 5/2015 | Wang et al. |
| 2016/0258301 A1 | 9/2016 | Chouhan et al. |

OTHER PUBLICATIONS

European Search Report Corresponding to Publication No. US2015147158 dated May 28, 2015.

\* cited by examiner

COOLING CIRCUIT FOR A TURBOMACHINE COMPONENT

FIELD

The present disclosure relates generally to cooling circuits for a turbomachine component. In particular, the disclosure relates to a turbomachine rotor blade cooling circuit.

BACKGROUND

Turbomachines are widely utilized in fields such as power generation. For example, a conventional gas turbine system includes a compressor section, a combustor section, and at least one turbine section. The compressor section is configured to compress air as the air flows through the compressor section. The air is then directed from the compressor section to the combustor section, where it is mixed with fuel and combusted, generating a hot gas flow. The hot gas flow is provided to the turbine section, which extracts energy from the hot gas flow to power the compressor, an electrical generator, and/or other various loads.

The turbine section typically includes multiple stages, which are disposed along the hot gas path such that the hot gases flow through first-stage nozzles and rotor blades and through the nozzles and rotor blades of follow-on turbine stages. The turbine rotor blades may be secured to a plurality of rotor disks that include the turbine rotor, with each rotor disk being mounted to the rotor shaft for rotation therewith.

A turbine rotor blade generally includes an airfoil that extends radially outward from a substantially planar platform and a shank portion that extends radially inward from the platform for securing the rotor blade to one of the rotor disks. A cooling circuit is circumscribed in the rotor blade to provide a path for cooling air from the compressor section to flow through and cool the various portions of the airfoil that are exposed to the high temperatures of the hot gas flow. In many rotor blades, a pin bank may be disposed within the cooling circuit. The pin bank functions to increase the amount of convective cooling within the rotor blade by increasing the overall surface area exposed to the compressor air. However, utilizing a pin bank that extends radially inward from the platform surface of the rotor blade creates flow path dead zones within the cooling circuit. For example, compressor air may swirl and/or linger within the cooling circuit causing unwanted hot spots and decreasing the overall gas turbine performance. Accordingly, a rotor blade cooling circuit that allows for the use of a pin bank without causing flow dead zones is desired in the art.

BRIEF DESCRIPTION

Aspects and advantages of the assemblies in accordance with the present disclosure will be set forth in part in the following description, or may be obvious from the description, or may be learned through practice of the technology.

In accordance with one embodiment, a turbomachine component is provided. The turbomachine component includes a platform and a shank. The platform includes a leading platform face, a trailing platform face and a platform surface. The shank extends radially inward from the platform. The rotor blade further includes an airfoil extending radially outward from the platform. The airfoil includes a leading edge and a trailing edge. A cooling circuit is defined within the shank and the airfoil. The cooling circuit includes a plurality of pins. The plurality of pins extends across the cooling circuit. The plurality of pins includes a first pin group positioned radially inward of the platform surface and a second pin group positioned within the airfoil. The second pin group is downstream from the first pin group. The cooling circuit further includes a plurality of exit channels disposed along the trailing edge. The plurality of exit channels is downstream from the plurality of pins. The cooling circuit also includes at least one bypass conduit extending from an inlet disposed in the cooling circuit to an outlet positioned on the trailing platform face. The at least one bypass conduit is positioned radially inward of the platform surface.

In accordance with another embodiment, a turbomachine is provided. The turbomachine includes a compressor section, a combustor section, and a turbine section. A plurality of rotor blades is provided in the turbine section, and each of the plurality of rotor blades includes a platform and a shank. The platform includes a leading platform face, a trailing platform face and a platform surface. The shank extends radially inward from the platform. The rotor blade further includes an airfoil extending radially outward from the platform. The airfoil includes a leading edge and a trailing edge. A cooling circuit is defined within the shank and the airfoil. The cooling circuit includes a plurality of pins. The plurality of pins extends across the cooling circuit. The plurality of pins includes a first pin group positioned radially inward of the platform surface and a second pin group positioned within the airfoil. The second pin group is downstream from the first pin group. The cooling circuit further includes a plurality of exit channels disposed along the trailing edge. The plurality of exit channels is downstream from the plurality of pins. The cooling circuit also includes at least one bypass conduit extending from an inlet disposed in the cooling circuit to an outlet positioned on the trailing platform face. The at least one bypass conduit is positioned radially inward of the platform surface.

These and other features, aspects and advantages of the present assemblies will become better understood with reference to the following description and appended claims. The accompanying drawings, which are incorporated in and constitute a part of this specification, illustrate embodiments of the technology and, together with the description, serve to explain the principles of the technology.

BRIEF DESCRIPTION OF THE DRAWINGS

A full and enabling disclosure of the present assemblies, including the best mode of making and using the present systems and methods, directed to one of ordinary skill in the art, is set forth in the specification, which makes reference to the appended figures, in which.

DETAILED DESCRIPTION

Figure 1:
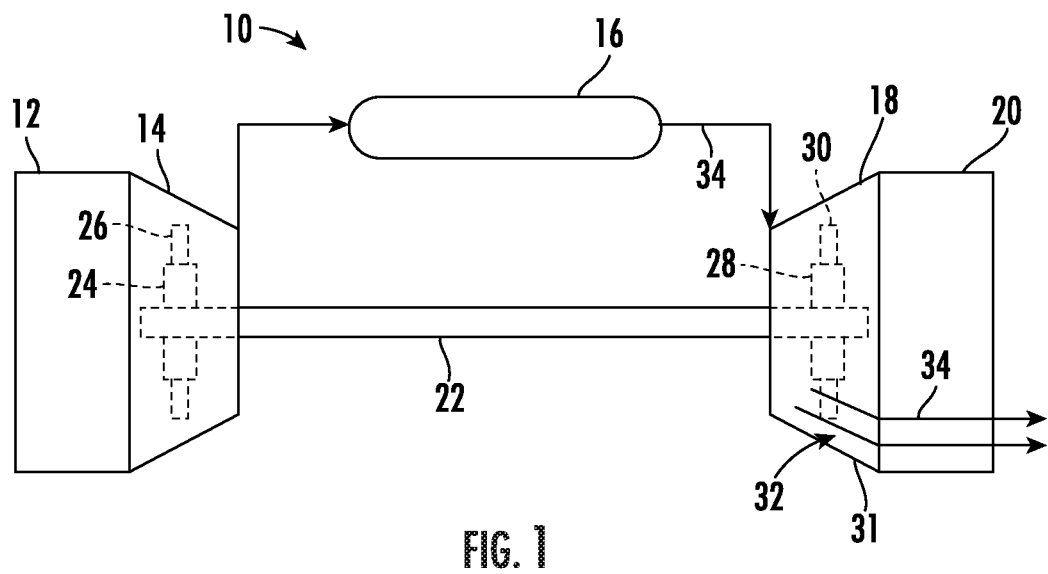
FIG. 1 is a schematic illustration of a turbomachine, in accordance with embodiments of the present disclosure.

Reference now will be made in detail to embodiments of the present assemblies, one or more examples of which are illustrated in the drawings. Each example is provided by way of explanation, rather than limitation of, the technology. In fact, it will be apparent to those skilled in the art that modifications and variations can be made in the present technology without departing from the scope or spirit of the claimed technology. For instance, features illustrated or described as part of one embodiment can be used with another embodiment to yield a still further embodiment. Thus, it is intended that the present disclosure covers such modifications and variations as come within the scope of the appended claims and their equivalents.

The detailed description uses numerical and letter designations to refer to features in the drawings. Like or similar designations in the drawings and description have been used to refer to like or similar parts of the invention. As used herein, the terms "first", "second", and "third" may be used interchangeably to distinguish one component from another and are not intended to signify location or importance of the individual components.

As used herein, the terms "upstream" (or "forward") and "downstream" (or "aft") refer to the relative direction with respect to fluid flow in a fluid pathway. For example, "upstream" refers to the direction from which the fluid flows, and "downstream" refers to the direction to which the fluid flows.

It is sometimes necessary to describe parts that are disposed at differing radial positions with regard to a center axis. The term "radially" refers to the relative direction that is substantially perpendicular to an axial centerline of a particular component; the term "axially" refers to the relative direction that is substantially parallel to, and/or coaxially aligned with, an axial centerline of a particular component; and the term "circumferentially" refers to the relative direction that extends around the axial centerline of a particular component.

Terms of approximation, such as "generally," or "about" include values within ten percent greater or less than the stated value. When used in the context of an angle or direction, such terms include within ten degrees greater or less than the stated angle or direction. For example, "generally vertical" includes directions within ten degrees of vertical in any direction, e.g., clockwise or counter-clockwise.

Referring now to the drawings, FIG. 1 illustrates a schematic diagram of one embodiment of a turbomachine, which in the illustrated embodiment is a gas turbine 10. Although an industrial or land-based gas turbine is shown and described herein, the present disclosure is not limited to an industrial and/or land-based gas turbine, unless otherwise specified in the claims. For example, the turbomachine components as described herein may be used in any type of turbomachine, including but not limited to a steam turbine, an aircraft gas turbine, or a marine gas turbine.

As shown, the gas turbine 10 generally includes an inlet section 12, a compressor section 14 disposed downstream of the inlet section 12, one or more combustors (not shown) within a combustor section 16 disposed downstream of the compressor section 14, a turbine section 18 disposed downstream of the combustor section 16, and an exhaust section 20 disposed downstream of the turbine section 18. Additionally, the gas turbine 10 may include one or more shafts 22 coupled between the compressor section 14 and the turbine section 18.

The compressor section 14 may generally include a plurality of rotor disks 24 (one of which is shown) and a plurality of rotor blades 26 extending radially outwardly from and connected to each rotor disk 24. Each rotor disk 24, in turn, may be coupled to or form a portion of the shaft 22 that extends through the compressor section 14.

The turbine section 18 may generally include a plurality of rotor disks 28 (one of which is shown) and a plurality of rotor blades 30 extending radially outwardly from and being interconnected to each rotor disk 28. Each rotor disk 28, in turn, may be coupled to or form a portion of the shaft 22 that extends through the turbine section 18. The turbine section 18 further includes an outer casing 31 that circumferentially surrounds a portion of the shaft 22 and the rotor blades 30, thereby at least partially defining a hot gas path 32 through the turbine section 18.

During operation, a working fluid such as air flows through the inlet section 12 and into the compressor section 14 where the air is progressively compressed, thus providing pressurized air to the combustors of the combustor section 16. The pressurized air is mixed with fuel and burned within each combustor to produce combustion gases 34. The combustion gases 34 flow through the hot gas path 32 from the combustor section 16 into the turbine section 18, where energy (kinetic and/or thermal) is transferred from the combustion gases 34 to the rotor blades 30, causing the shaft 22 to rotate. The mechanical rotational energy may then be used to power the compressor section 14 and/or to generate electricity. The combustion gases 34 exiting the turbine section 18 may then be exhausted from the gas turbine 10 via the exhaust section 20.

Figure 2:
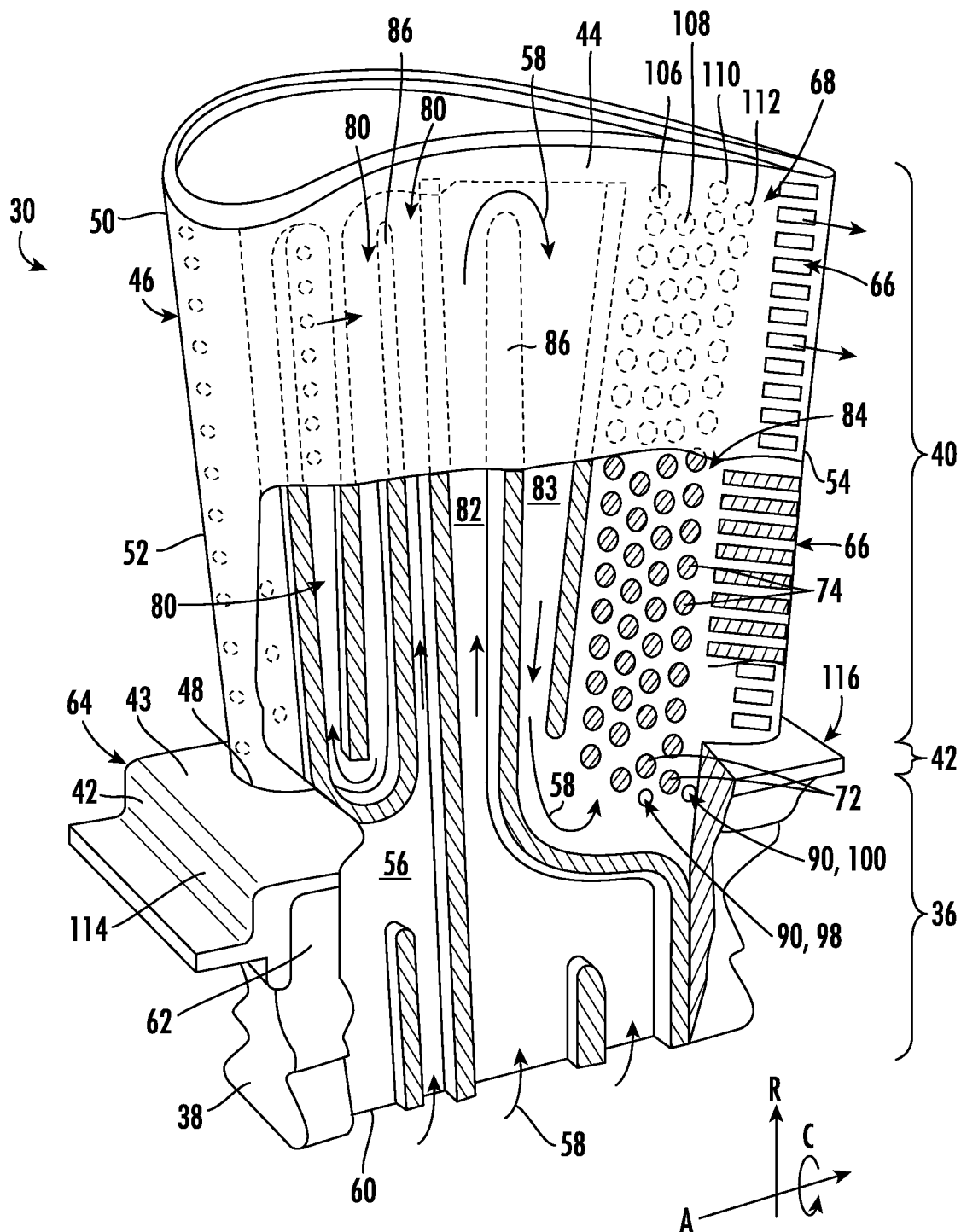
FIG. 2 illustrates a perspective view of a rotor blade, in accordance with embodiments of the present disclosure.
Figure 6:
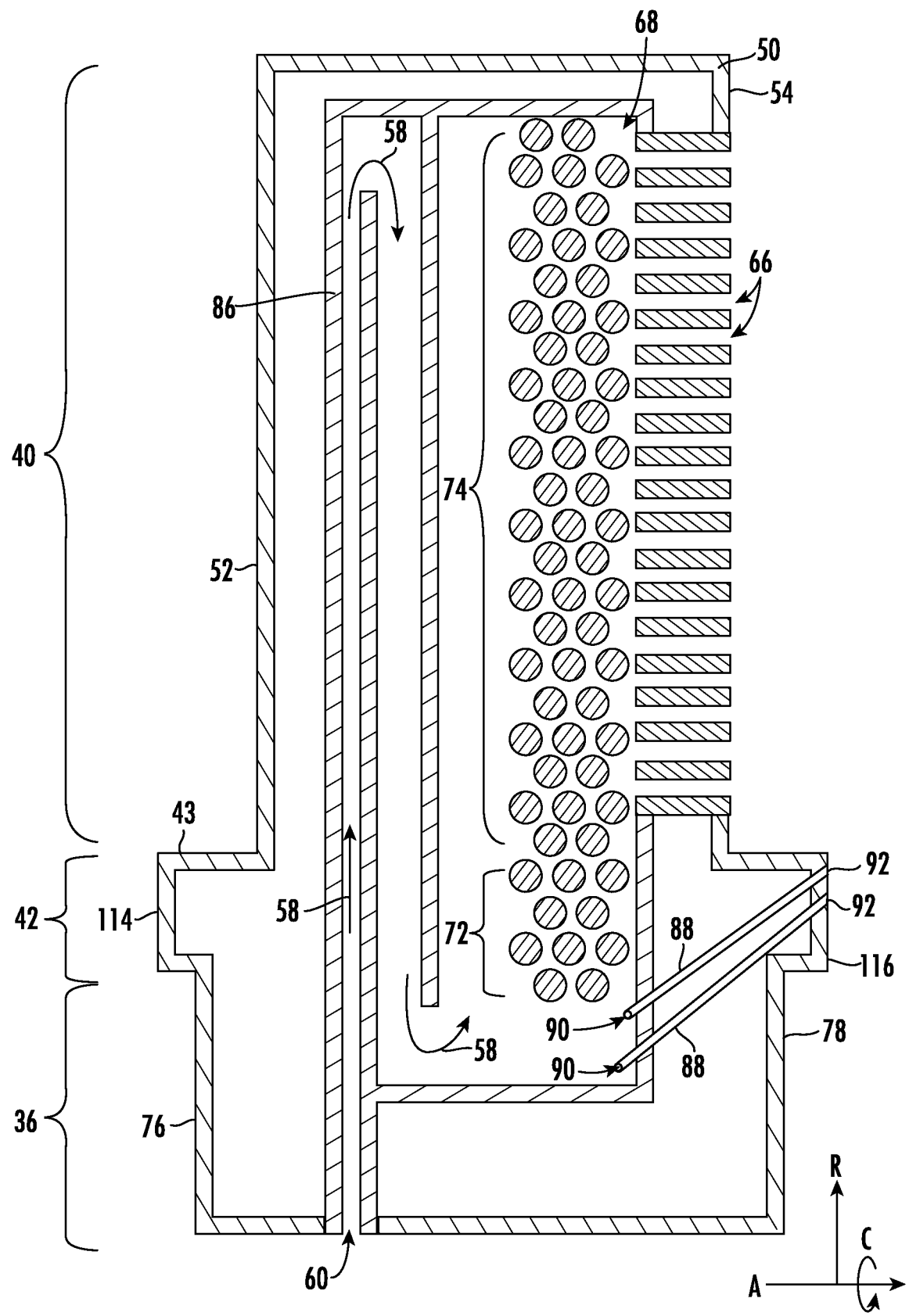
FIG. 6 illustrates a cross-sectional view of a rotor blade, in accordance with embodiments of the present disclosure.

As best seen in FIGS. 2 and 6, the gas turbine 10 may define an axial direction A and a circumferential direction C, which extends around the axial direction A. The gas turbine 10 may also define a radial direction R perpendicular to the axial direction A. As used herein, a turbomachine component may be a rotor blade 26 and/or 30 in some embodiments. In other embodiments, a turbomachine component may be a stator vane (not shown). The function and structure of a stator vane is understood and is therefore not described herein.

FIG. 2 is a perspective view of an exemplary rotor blade 30, as may incorporate one or more embodiments of the present disclosure. As shown in FIG. 2, the rotor blade 30 generally includes a mounting or shank portion 36 having a mounting body 38 and an airfoil 40 extending substantially radially outwardly from a platform 42. As shown in FIGS. 2 through 6, the platform 42 may be positioned radially between the shank portion 36 and the airfoil 40. In many embodiments, the platform 42 may further include a platform surface 43, which may serve as the radially inward boundary for the combustion gases 34 flowing through the hot gas path 32 of the turbine section 18 (FIG. 1).

In some embodiments, the platform surface 43 may be the radially outermost surface of the platform 42 and may form a direct intersection with the airfoil 40. The platform 42 may generally surround the airfoil 40 and may be positioned at an intersection or transition between the airfoil 40 and the shank portion 36. Similarly, the platform surface 43 may be positioned at the intersection of the platform 42 and the airfoil 40. In many embodiments, the platform 42 may extend axially beyond the shank portion 36.

The platform 42 may also include a leading platform face 114 that faces the combustion gases 34 and a trailing platform face 116 that is axially separated from the leading platform face 114. The trailing platform face 116 may be downstream from the leading platform face 114. As shown in FIG. 2, the platform 42 may terminate in the axial A direction at the respective leading platform face 114 and trailing platform face 116. The mounting body 38 of the shank portion 36 may extend radially inwardly from the platform 42 and may include a root structure, such as a dovetail, configured to interconnect or secure the rotor blade 30 to the rotor disk 28 (as shown in FIG. 1).

Figure 3:
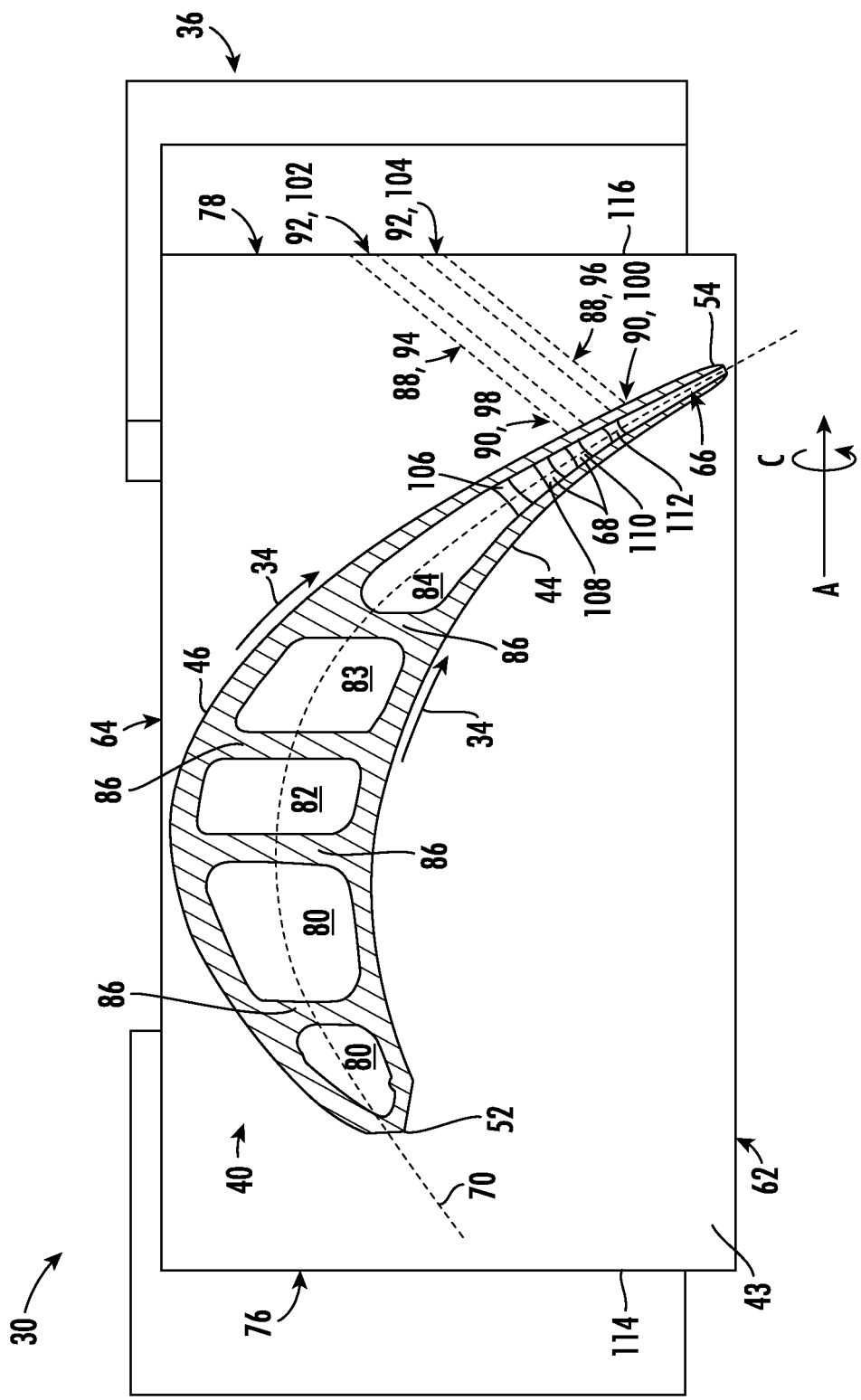
FIG. 3 illustrates a cross-sectioned top view of a rotor blade, in accordance with embodiments of the present disclosure.
Figure 4:
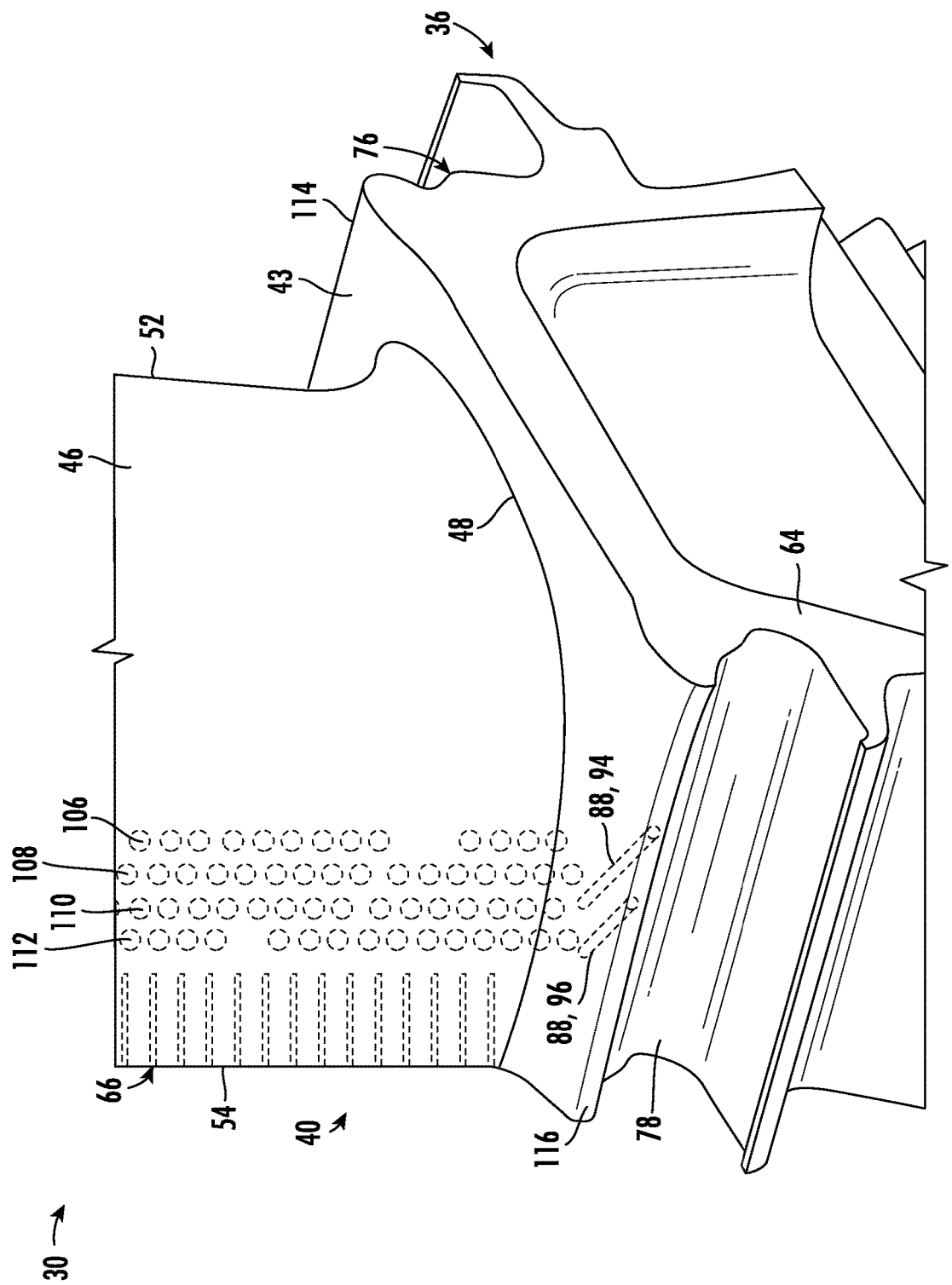
FIG. 4 illustrates an enlarged perspective view of a rotor blade, in accordance with embodiments of the present disclosure.

The airfoil 40 may have a generally aerodynamic contour and may include a pressure side wall 44 and an opposing suction side wall 46. A camber axis 70 (as shown in FIG. 3) may be defined between the pressure side wall 44 and the suction side wall 46, and the camber axis 70 may be generally curved or arcuate. In various embodiments, the pressure side wall 44 and the suction side wall 46 may extend substantially radially outward from the platform 42, in span, from a root 48 of the airfoil 40 to a tip 50 of the airfoil 40. The root 48 of the airfoil 40 may be defined at an intersection between the airfoil 40 and the platform surface 43. The pressure side wall 44 generally comprises an aerodynamic, concave external surface of the airfoil 40. Similarly, the suction side wall 46 may generally define an aerodynamic, convex external surface of the airfoil 40.

The airfoil 40 may include a leading edge 52 and a trailing edge 54 spaced apart from one another and defining the terminal ends of the airfoil 40 in the axial direction A. The leading edge 52 of airfoil 40 may be the first portion of the airfoil 40 to engage, i.e., be exposed to, the combustion gases 34 along the hot gas path 32. The combustion gases 34 may be guided along the aerodynamic contour of airfoil 40, i.e., along the suction side wall 46 and pressure side wall 44, before being exhausted at the trailing edge 54.

The tip 50 is disposed radially opposite the root 48. As such, the tip 50 may generally define the radially outermost portion of the rotor blade 30 and, thus, may be configured to be positioned adjacent to a stationary shroud or seal (not shown) of the gas turbine 10.

The shank portion 36 may include a pressure-side slash face 62 and a suction-side slash face 64. The pressure-side slash face 62 may be circumferentially spaced apart from the suction-side slash face 64. In some embodiments, the pressure-side slash face 62 and/or suction-side slash face 64 may be generally planar faces (which may be conventionally planar or skewed). In other embodiments, the pressure-side slash face 62 and/or suction-side slash face 64 or at least portions thereof may be curviplanar. For example, in the embodiment shown in FIG. 2, the pressure-side slash face 62 or suction-side slash face 64 may be curved relative to the axial direction, the radial direction, and/or the tangential direction.

The shank portion 36 may further include a leading edge face 76 that is axially spaced apart from a trailing edge face 78. In some embodiments, the leading edge face 76 may be positioned into the flow of the combustion gases 34, and the trailing edge face 78 may be positioned downstream from the leading edge face 76. In many embodiments, as shown, the leading edge face 74 and the trailing edge face 76 may each be positioned radially inwardly of the leading platform face 114 and the trailing platform face 116, respectively.

As shown in FIG. 2, the rotor blade 30 may be at least partially hollow, e.g., a cooling circuit 56 (shown partially in dashed lines in FIG. 2) may be circumscribed within the airfoil 40 for routing a coolant 58 through the airfoil 40 between the pressure side wall 44 and the suction side wall 46, thus providing convective cooling thereto. The cooling circuit 56 may be defined within the shank portion 36, the platform 42, and the airfoil 40 and may include one or more cooling passages 80, 82, 83, 84 for directing coolant 58 through various sections of the rotor blade 30. For example, the cooling circuit may include one or more leading edge passages 80, one or more mid-body passages 82, 83, and one or more trailing edge passages 84. The coolant 58 may include a portion of the compressed air from the compressor section 14 (FIG. 1) and/or steam or any other suitable fluid or gas for cooling the airfoil 40. One or more cooling passage inlets 60 are disposed along the rotor blade 30. In some embodiments, one or more cooling passage inlets 60 are formed within, along or by the mounting body 38. The cooling passage inlets 60 are in fluid communication with at least one corresponding cooling passage 80, 82, 83, 84.

FIG. 3 illustrates a cross-sectional top view of rotor blade 30, in accordance with embodiments of the present disclosure. As shown, the cooling circuit 56 may include multiple cooling passages 80, 82, 83, 84 separated by ribs 86. For example, the rotor blade 30 may include one or more leading edge passages 80, one or more mid-body passages 82, 83 downstream from the leading edge passages 80, and one or more trailing edge passages 84 downstream from the mid-body passages 82, 83 relative to the direction of combustion gas flow 34.

As shown, the leading edge passages 80 may be defined within the rotor blade 30 directly downstream from the leading edge 52 of the airfoil 40 with respect to the direction of combustion gas 34 flow over the airfoil 40. Likewise, the trailing edge passage 84 may be defined within the rotor blade 30 directly upstream from the trailing edge 54 of the airfoil 40 with respect to the direction of combustion gas 34 flow over the airfoil. The mid-body passages 82, 83 may be defined within the rotor blade 30 axially between the leading edge passages 80 and the trailing edge passages 84 with respect to the camber axis 70.

As shown best in FIG. 2, the coolant 58 may travel generally radially, both inward and outward, through the cooling circuit 56 and cooling passages 80, 82, 83, 84 to advantageously cool the various crevices, cavities, and portions of the rotor blade 30. For example, in the embodiment shown in FIG. 2, the coolant 58 may enter the rotor blade 30 via the cooling passage inlets 60 defined within the mounting body 38 and travel generally radially outward through a mid-body passage 82 until reaching the tip 50 of the airfoil 40. At which point, the coolant 58 may curve around one or more ribs 86 and reverse directions to continue traveling generally radially inward through another mid-body air passage 83. The coolant 58 may reverse directions once again, upon entering the trailing edge passage 84, and travel generally radially outward, over the plurality of pins 68, and towards a plurality of exit channels 66.

In many embodiments, such as the one shown in FIG. 2, the airfoil 40 may define the plurality of exit channels 66 along the trailing edge 54, which are fluidly coupled to the cooling circuit 56. In some embodiments, the exit channels 66 may be defined along the trailing edge 54 of the airfoil 40 and directly fluidly coupled to the trailing edge passage 84. The exit channels may be spaced apart from one another along the radial direction R and may advantageously provide an outlet for the coolant 58 traveling through the cooling circuit 56. The plurality of exit channels 66 may be shaped as substantially hollow cylinders spaced apart from one another and defined between the pressure side wall 44 and the suction side wall 46 of airfoil 40. Further, as shown in FIG. 3, the plurality of exit channels 66 may be oriented along the camber axis 70. The exit channels 66 may provide for outlet for the coolant 58 traveling through the airfoil 40 to exit the cooling circuit 56. In many embodiments, the coolant 58 may be exhausted from the exit channels 66 to mix with the combustion gases 34 traveling through the turbine section 18.

As shown in FIGS. 2 and 3, the plurality of pins or pins 68 may be disposed within the cooling circuit 56 directly upstream from the plurality of exit channels 66 with respect to the direction of coolant 58 flow within the cooling circuit 56. In some embodiments, the pins 68 may extend across the trailing edge passage 84. The plurality of pins 68 may extend across the cooling circuit 56 and may be arranged in an array or pattern within the cooling circuit 56. In many embodiments, the plurality of pins 68 may be positioned to allow coolant 58 to pass between and around the pins 68. In some embodiments, the plurality of pins 68 may function to increase the surface area that is exposed to convective cooling of the coolant 58 passing through the cooling circuit 56. Each pin 68 of the plurality of pins 68 may have a substantially circular cross section. However, in other embodiments (not shown), each pin 68 may have an oval, square, rectangular, or any other polygonal cross-sectional shape.

In some embodiments, such as the ones shown in FIGS. 2 through 5, the plurality of pins 68 may include four pin rows 106, 108, 110, 112, each extending between the shank portion 36 and the tip 50 of rotor blade 30. For example, a first pin row 106, a second pin row 108, a third pin row 110, and a fourth pin row 112 may be arranged adjacent to one another within the rotor blade 30. As shown in FIGS. 2 through 5, the first pin row 106 may be the axially innermost of the four pin rows 106, 108, 110, 112. Further, the second pin 108 row may be axially outward from first pin row 106, the third pin row 110 may be axially outward the second pin row 108, and the fourth pin row 112 may be axially outward the third pin row 110. As shown, at least a portion of the fourth pin row 112 may be directly neighboring the exit channels 66 within the cooling circuit 56.

In various embodiments, the plurality of pins 68 may include a first pin group 72 positioned radially inward of the platform surface 43 (e.g., in platform 42 and/or in the shank portion 36) and a second pin group 74 disposed in the airfoil 40. In many embodiments, the second pin group 74 may be disposed downstream from the first pin group 72 with respect to the direction of coolant 58 flow within the cooling circuit 56, e.g., generally radially outward. The first pin group 72 may be disposed within the cooling circuit 56 and between the pressure-side slash face 62 and the suction-side slash face 64 of shank portion 36. In many embodiments, the first pin group 72 may be disposed radially inward of the platform surface 43 and/or within the shank portion 36 of the rotor blade 30. The second pin group 74 may be disposed within the cooling circuit 56, downstream from the first pin group 72 and upstream from the plurality of exit channels 66. The second pin group 74 may be disposed radially outward from the first pin group 72 and the platform surface 43. The second pin group 74 may extend across the airfoil 40 (FIG. 3). For example, the second pin group 74 may extend between the pressure side wall 44 and the suction side wall 46 of the airfoil 40.

In many embodiments, such as the ones shown in FIGS. 2 and 3, the second pin group 74 may be disposed in the trailing edge passage 84 and may extend generally perpendicular to the camber axis 70 from the pressure side wall 44 to the suction side wall 46. As shown in FIG. 3, the plurality of exit channels 66 may be positioned directly downstream from the second pin group 74 with respect to the direction of combustion gases 34 flowing generally parallel to the camber axis 70.

As shown in FIGS. 2 through 6 collectively, the rotor blade 30 may further include one or more bypass conduits 88 extending from an inlet 90 disposed within the cooling circuit 56 to an outlet 92 positioned on the trailing platform face 116. The one or more bypass conduits 88 may be shaped as hollow cylinders that each provide a passageway between the trailing edge passage 84 of the cooling circuit 56 and the hot gas path 32 (FIG. 1). The bypass conduits 88 may have a circular cross-sectional shape as shown, or, in other embodiments (not shown), the bypass conduits 88 may have an oval, square, rectangular, or any other polygonal cross-sectional shape.

The one or more bypass conduits 88 may positioned radially inward of the platform surface 43. In some embodiments, the one or more bypass conduits 88 may be defined within both the platform 42 and the shank portion 36 of the rotor blade 30 and may be disposed radially inward of the platform surface 43. In other embodiments, the bypass conduits 88 may be defined entirely within the shank portion 36 and disposed radially inward of the platform surface 43. In yet still other embodiments, the bypass conduits 88 may be defined entirely within the platform 42 and disposed radially inward of the platform surface 43.

As shown in FIG. 3 through 6, the at least one bypass conduit 88 may extend from the inlets 90, towards the suction-side slash face 64, to the outlets 92 disposed on the trailing platform face 116. In many embodiments, as shown in FIG. 3, the at least one bypass conduit 88 may extend generally perpendicular to the suction side wall 46 of airfoil 40.

As shown in FIG. 2, the inlet 90 of each of the one or more bypass conduits 88 may be generally upstream from the first pin group 72 with respect to the flow of coolant 58 within the cooling circuit 56. For example, in some embodiments, the inlets 90 of the bypass conduits 88 may be radially inward from the first pin group 72.

Each bypass conduit 88 of the one or more bypass conduits 88 may include a constant diameter from the inlet 90 to the outlet 92. For example, in some embodiments, each bypass conduit 88 of the one or more bypass conduits 88 may have a diameter between about 0.01 inches and about 0.2 inches. In many embodiments, each bypass conduit 88 of the one or more bypass conduits 88 may have a diameter between about 0.025 inches and about 0.175 inches. In other embodiments, each bypass conduit 88 of the one or more bypass conduits 88 may have a diameter between about 0.05 inches and about 0.15 inches. In various embodiments, each bypass conduit 88 of the one or more bypass conduits 88 may have a diameter between about 0.075 inches and about 0.125 inches. In some embodiments, each bypass conduit 88 of the one or more bypass conduits 88 may have a diameter up to about 0.1 inches.

Figure 5:
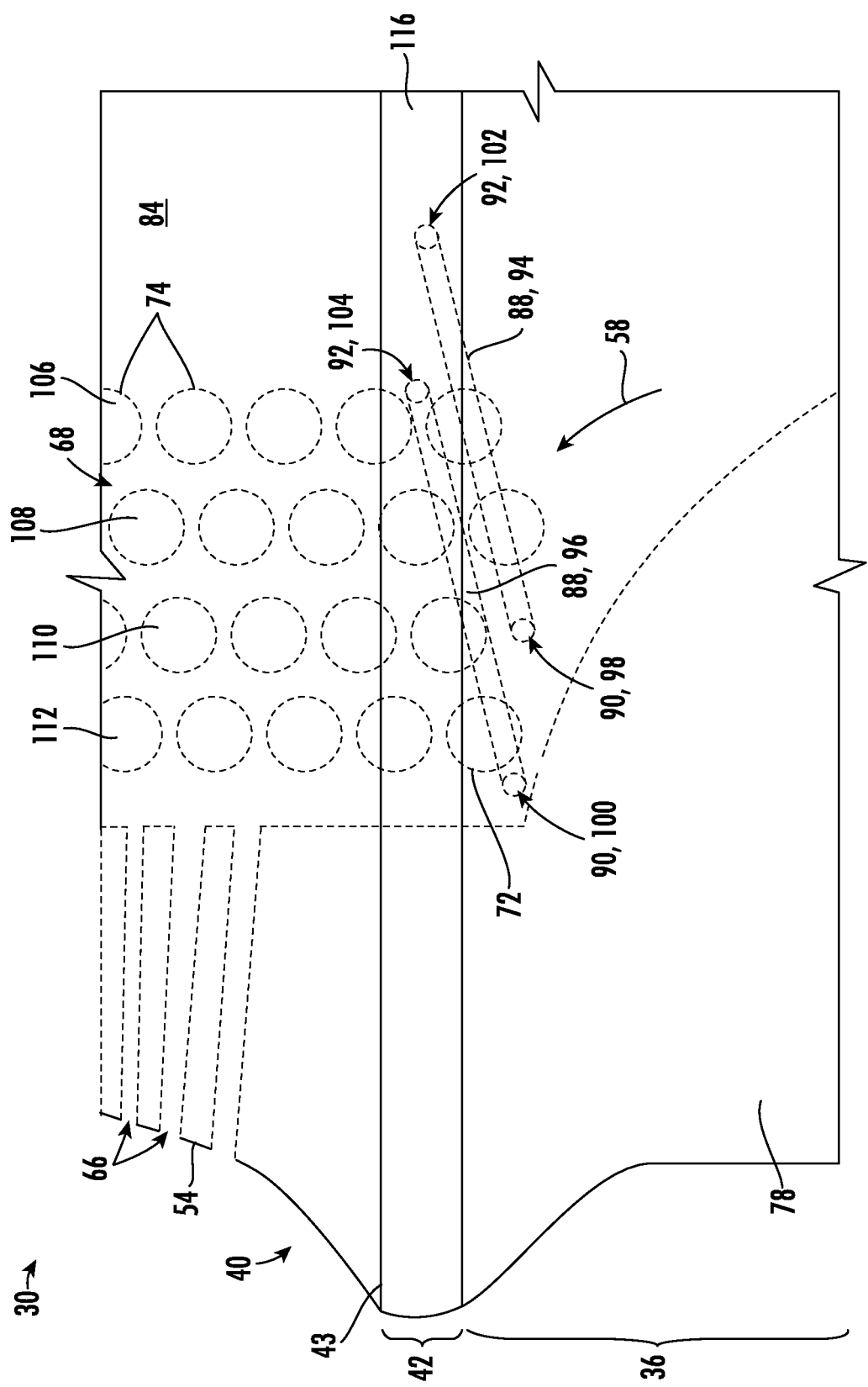
FIG. 5 illustrates an enlarged side view of a rotor blade, in accordance with embodiments of the present disclosure.

In many embodiments, the bypass conduits 88 may be defined within the shank portion 36 and the platform 42 and may extend from an inlet 90 positioned in the trailing edge passage 84, towards the suction-side slash face 64, to an outlet 92 disposed on the trailing platform face 116. In particular embodiments, as shown in FIG. 5, the one or more bypass conduits 88 may include a first bypass conduit 94 and a second bypass conduit 96, each having a respective inlet 98, 100 within the cooling circuit 56 and a respective outlet 102, 104 disposed on the trailing platform face 116. In such embodiments, the respective inlet 100 of the second bypass conduit 96 may be positioned downstream the plurality of pins 68 and upstream the plurality of exit channels 66 with respect to the direction of combustion gas flow 34 over the airfoil 40 (FIG. 3). For example, as shown in FIG. 3, the direction of combustion gas flow 34 may be from the leading edge 52 to the trailing edge 54 of airfoil 40 and generally parallel to the camber axis 70. In such embodiments, the respective inlet 100 of the second bypass conduit 96 may be positioned axially between the exit channels 66 and the plurality of pins 68 with respect to the camber axis 70.

In particular embodiments, such as the ones shown in FIGS. 2 through 5, the respective inlet 98 of the first bypass conduit 94 may be positioned directly radially inward from the third pin row 110. Additionally or alternatively, the respective inlet 100 of the second bypass conduit 96 may be axially outward from the fourth pin row 112 with respect to the camber axis 70 from the leading edge 52 to the trailing edge 54 of airfoil 40 (FIG. 3), i.e., the direction of combustion gas 34 flow.

FIG. 6 illustrates a simplified cross-section of a rotor blade 30 in accordance with embodiments of the present disclosure. As shown, the bypass conduits 88 may extend from an inlet 90 within the trailing edge passage 84, upstream from the first pin group 72, to an outlet 92 disposed on the trailing platform face 116. Further, the bypass conduits 88 may be defined entirely below (radially inward of) the platform surface 43, i.e., within the shank portion 36 and the platform 42, and may extend generally radially outward, towards the platform surface 43, to an outlet 92 positioned on the trailing platform face 116. The bypass conduit 88 may advantageously function to provide a pressure drop within the trailing edge passage 84 that pulls at least a portion of coolant 58 towards itself for uniform cooling flow distribution.

During operation of the gas turbine engine 10 (FIG. 1), cooling fluid flows through the passages, cavities, and apertures described above to cool the rotor blade 30. More specifically, coolant 58 (e.g., bleed air from the compressor section 14) enters the rotor blade 30 through the cooling passage inlets 60 (FIG. 2). This coolant 58 flows through the cooling circuit 56 and the various cooling passages 80, 82, 83, 84 to convectively cool both the shank portion 36 and the airfoil 40 of the rotor blade 30. The cooling fluid 58 flows around and between the pins 68 and may then exit the cooling circuit 56 through the exit channels 66 and/or the one or more bypass conduits 88 and flow into the combustion gases 34 (FIG. 1). The plurality of exit channels 66 may be positioned radially outward from the platform 42 and fluidly coupled to the cooling circuit 56. Due to the pressure drop created by the exit channels 66 within the cooling circuit 56, the coolant 58 flowing through the cooling circuit 56 may travel substantially radially outwardly and towards the exit channels 66. The one or more bypass conduits 88 function to create a pressure drop within the portion of the cooling circuit 56 that is defined radially inward of the platform surface 43. The pressure drop created by the one or more bypass conduits 88 advantageously pulls at least a portion of coolant 58 over the first pin group 72 and towards the inlets 90 to form a uniform coolant 58 flow distribution within the trailing edge passage 84.

This written description uses examples to disclose the invention, including the best mode, and also to enable any person skilled in the art to practice the invention, including making and using any devices or systems and performing any incorporated methods. The patentable scope of the invention is defined by the claims and may include other examples that occur to those skilled in the art. Such other examples are intended to be within the scope of the claims, if they include structural elements that do not differ from the literal language of the claims, or if they include equivalent structural elements with insubstantial differences from the literal language of the claims.

What is claimed is:

1. A turbomachine component, comprising:
a platform, the platform having a leading platform face, a trailing platform face, and a platform surface;
a shank extending radially inward from the platform;
an airfoil extending radially outward from the platform, the airfoil including a leading edge and a trailing edge;
a cooling circuit defined within the shank and the airfoil, the cooling circuit comprising:
a plurality of pins extending across the cooling circuit, the plurality of pins including a first pin group positioned radially inward of the platform surface and a second pin group positioned within the airfoil downstream from the first pin group;
a plurality of exit channels disposed along the trailing edge of the airfoil downstream from the plurality of pins; and
at least one bypass conduit extending from an inlet disposed in the cooling circuit to an outlet positioned on the trailing platform face, the at least one bypass conduit being positioned radially inward of the platform surface; and wherein the shank includes a suction-side slash face circumferentially separated from a pressure-side slash face and the at least one bypass conduit extends from the inlet, towards the suction-side slash face, to the outlet.

2. The turbomachine component as in claim 1, wherein the at least one bypass conduit includes a first bypass conduit and a second bypass conduit, the first bypass conduit and second bypass conduit each having a respective inlet disposed in the cooling circuit and a respective outlet disposed on the trailing platform face.

3. The turbomachine component as in claim 2, wherein the respective inlet of the second bypass conduit is downstream from the plurality of pins and upstream from the plurality of exit channels with respect to a camber line of the airfoil from the leading edge to the trailing edge of the airfoil.

4. The turbomachine component as in claim 1, wherein the cooling circuit includes a leading edge passage, a mid-body passage, and a trailing edge passage, the inlet of the at least one bypass conduit being disposed in the trailing edge passage.

5. The turbomachine component as in claim 1, wherein the at least one bypass conduit is defined within the platform and the shank.

6. The turbomachine component as in claim 5, wherein the at least one bypass conduit has a diameter between about 0.01 inches and about 0.2 inches.

7. The turbomachine component as in claim 1, wherein the pins of the second pin group of the plurality of pins extend from the suction side wall to the pressure side wall.

8. The turbomachine component as in claim 1, wherein the plurality of pins is arranged in four rows extending between the shank and a tip of the airfoil.

9. A turbomachine, comprising:
a compressor section;
a combustor section;
a turbine section;
a plurality of rotor blades provided in the turbine section, each of the plurality of rotor blades comprising:
a platform, the platform having a leading platform face, a trailing platform face, and a platform surface;
a shank extending radially inward from the platform;
an airfoil extending radially outward from the platform, the airfoil including a leading edge and a trailing edge;
a cooling circuit defined within the shank and the airfoil, the cooling circuit comprising:

a plurality of pins extending across the cooling circuit, the plurality of pins including a first pin group positioned radially inward of the platform surface and a second pin group positioned within the airfoil downstream from the first pin group;

a plurality of exit channels disposed along the trailing edge of the airfoil downstream from the plurality of pins; and at least one bypass conduit extending from an inlet disposed in the cooling circuit to an outlet positioned on the trailing platform face, the at least one bypass conduit being positioned radially inward the platform surface; and wherein the cooling circuit includes a leading edge passage, a mid-body passage, and a trailing edge passage, the inlet of the at least one bypass conduit being disposed in the trailing edge passage.

10. The turbomachine as in claim 9, wherein the at least one bypass conduit includes a first bypass conduit and a second bypass conduit, the first bypass conduit and second bypass conduit each having a respective inlet disposed in the cooling circuit and a respective outlet disposed on the trailing platform face.

11. The turbomachine as in claim 10, wherein the respective inlet of the second bypass conduit is downstream the plurality of pins and upstream the plurality of exit channels with respect to a camber line of the airfoil from the leading edge to the trailing edge of the airfoil.

12. The turbomachine as in claim 9, wherein the shank includes a suction-side slash face circumferentially separated from a pressure-side slash face.

13. The turbomachine as in claim 12, wherein the at least one bypass conduit extends from the inlet, towards the suction-side slash face, to the outlet.

14. The turbomachine as in claim 9, wherein the at least one bypass conduit is defined within the platform and the shank.

15. The turbomachine as in claim 14, wherein the at least one bypass conduit has a diameter between about 0.01 inches and about 0.2 inches.

16. The turbomachine as in claim 9, wherein the pins of the second pin group of the plurality of pins extend from the suction side wall to the pressure side wall.

17. The turbomachine as in claim 9, wherein the plurality of pins is arranged in four rows extending between the shank and a tip of the airfoil.

18. A turbomachine component, comprising: a platform, the platform having a leading platform face, a trailing platform face, and a platform surface; a shank extending radially inward from the platform; an airfoil extending radially outward from the platform, the airfoil including a leading edge and a trailing edge; a cooling circuit defined within the shank and the airfoil, the cooling circuit comprising: a plurality of pins extending across the cooling circuit, the plurality of pins including a first pin group positioned radially inward of the platform surface and a second pin group positioned within the airfoil downstream from the first pin group; a plurality of exit channels disposed along the trailing edge of the airfoil downstream from the plurality of pins; and at least one bypass conduit extending from an inlet disposed in the cooling circuit to an outlet positioned on the trailing platform face, the at least one bypass conduit being positioned radially inward of the platform surface; wherein the at least one bypass conduit includes a first bypass conduit and a second bypass conduit, the first bypass conduit and second bypass conduit each having a respective inlet disposed in the cooling circuit and a respective outlet disposed on the trailing platform face; and wherein the respective inlet of the second bypass conduit is downstream from the plurality of pins and upstream from the plurality of exit channels with respect to a camber line of the airfoil from the leading edge to the trailing edge of the airfoil.

* * * * *